July 28, 1970     R. C. COONS     3,521,717

DEVICE FOR CONVERTING A SNOWMOBILE TO A WHEELED VEHICLE

Filed Nov. 29, 1968     2 Sheets-Sheet 1

INVENTOR.
ROBERT C. COONS
BY
Walter F. Wassendorf Jr.
attorney

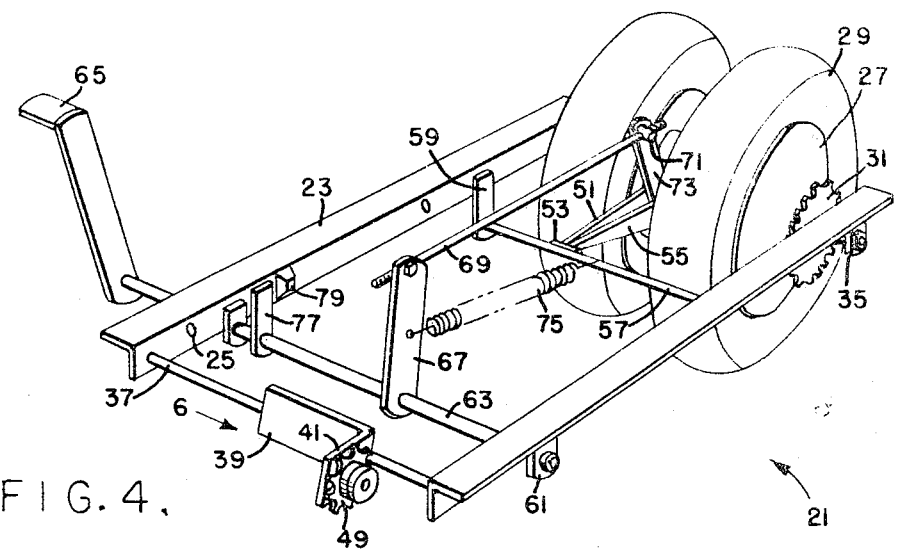

United States Patent Office 3,521,717
Patented July 28, 1970

3,521,717
DEVICE FOR CONVERTING A SNOWMOBILE TO A WHEELED VEHICLE
Robert C. Coons, Curry Bush Road, Box 315, R.D. 5, Schenectady, N.Y. 12306
Filed Nov. 29, 1968, Ser. No. 779,762
Int. Cl. B62m 27/02
U.S. Cl. 180—5
3 Claims

ABSTRACT OF THE DISCLOSURE

A chassis-frame device adapted for converting a conventional snow vehicle to a wheel vehicle after removing the track, boggie wheels, rear sprocket and front skis and then bolting or otherwise attaching the chassis-frame device to the frame of the snow vehicle and replacing the front skis with front wheels. The device comprises frame members, an axle mounting rear wheels and a driven sprocket, a drive sprocket and a drive chain trained over the drive and driven sprockets to transmit drive to the rear wheels.

---

This invention relates to a chassis-frame device for a snow vehicle.

A conventional snow vehicle comprises a chassis or frame, a track that is power-driven by an engine or power-driving means, front-steering skis, a steering means for steering the front skis provided by a handlebar or steering wheel and a seat. The problem in the art to which this invention appertains is the need for a chassis-frame device by means of which a conventional snow vehicle can be easily, quickly and simply converted for use as a wheel vehicle. Conventional snow vehicles are limited and restricted in their use to the wintertime. Hence, other than their use in the wintertime, conventional snow vehicles cannot be utilized for recreational and other purposes for use and enjoyment in the spring, summer and fall. The object of this invention, therefore, is to contribute to the solution of this discussed problem of the art by providing a chassis-frame device adapted for easily, quickly and simply converting a conventional snow vehicle to a wheel vehicle for use as well in the spring, summer and fall.

This object and other objects of the invention should be discerned and appreciated from the detailed specification taken in conjunction with the drawings, wherein like reference numerals refer to similar parts throughout the several views, in which:

FIG. 4 is a view of the chassis-frame device of this invention;

FIG. 5 is a view of the chassis-frame device of this invention showing drive transmitted to the rear wheels by the drive train;

Figure 1:
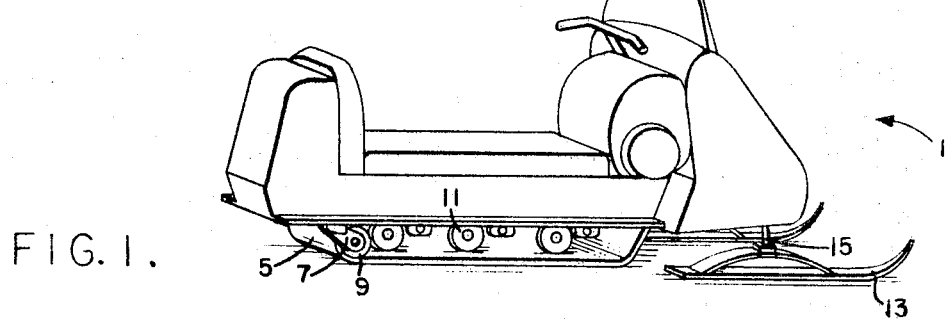
FIG. 1 is a view of a conventional snow vehicle.

In FIG. 1, reference numeral 1 generally refers to a conventional snow vehicle.

Figure 2:
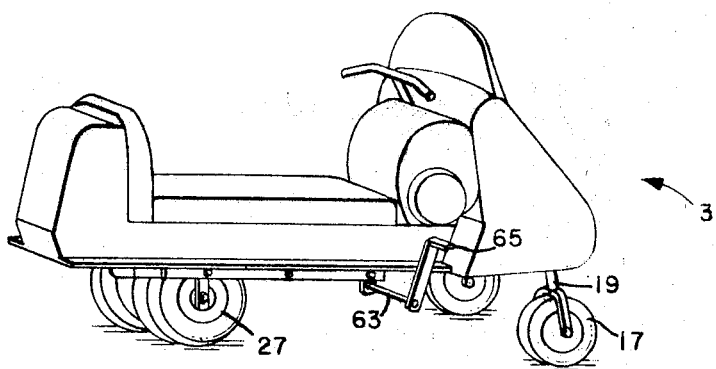
FIG. 2 is a view of a conventional snow vehicle with its drive track and front skis removed, and converted to a wheel vehicle by the chassis-frame device of the invention.
Figure 3:
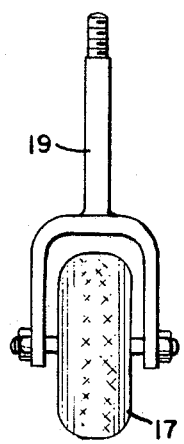
FIG. 3 is a view of a front wheel mounted by its spindle.

In FIG. 2 reference numeral 3 generally refers to a conventional snow vehicle with its drive track and front skis removed, and converted to a wheel vehicle by the chassis frame device of this invention.

To convert a conventional snow vehicle, as shown in FIG. 1, to a wheel vehicle, as shown in FIG. 2, one removes the track 5, support arm 7, rear sprocket 9, boggie wheels 11, and front skis 13 and their spindles 15. Then the front wheels 17 and their spindles 19 are mounted in place of the front skis 13 and spindles 15. Next the chassis-frame device of the invention shown in FIG. 4 and generally referred to by reference numeral 21 is bolted to the frame of the snow vehicle.

The chassis-frame device 21 comprises two longitudinal frame members or angle-irons 23 having bolt holes 25 for inserting bolts therethrough for bolting the angle-irons 23 to the frame of the snow vehicle.

Two rear wheels 27 mounting pneumatic tires 29, a steel brake drum (not shown) therebetween and a driven sprocket 31 are co-rotatably mounted freely by bearings (not shown) on axle 33 fixed to brackets 35 which depend from each of the lateral side of angle-irons 23.

Figure 6:
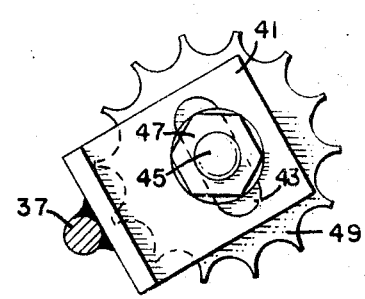
FIG. 6 is a view of the adjustable idler sprocket of the invention.

Transversely carried on angle-irons 23 is a cross rod 37 which fixedly carries an L-shaped bracket 39 having a small leg 41. As shown more fully in FIG. 6, small leg 41 has a slot 43 therethrough to adjustably mount thereby a jack shaft 45 by its securing nut 47. Jack shaft 45 freely mounts idler sprocket 49.

Not shown is a conventional external contracting brake comprising a flexible band wrapped around the steel drum co-rotatably mounted with the rear wheels 27 and pivot-connected to brake lever arm 73. Support arms 51 and 55 retain and support one end of the flexible band (not shown). The ends of arms 51 and 55 are welded to a plate 53 which is welded to a support rod 57 fixed to brackets 59 which depend from angle-irons 23.

Freely mounted in journals 61 depending from angle-irons 23 is a brake operating shaft 63 having fixed therewith a brake pedal 65 and lever 67. An adjustable pull rod 69 is connected by swivel joints 71 to lever 67 and arm 73, and the tail portions of return tension spring 75 are connected to lever 67 and lever arm 73, as shown.

It should be appreciated that the external contracting brake is actuated by depressing the brake pedal 65. Upon releasing brake pedal 65, the tension spring 75 returns the external contracting brake to its non-operating position with arm 77 fixed to brake operating shaft 63 abutting a stop 79 extending transversely from angle-iron 23 and thereby functioning as a limit stop.

To complete the conversion of the snow vehicle to a wheel vehicle, a drive sprocket 81 is emplaced on the engine drive shaft 83 and a drive chain 85 is trained around the drive sprocket 81 and driven sprocket 31 to thereby transmit drive to the rear wheels 27. Suitable adjustment of idler sprocket 49 provides tension on drive chain 85 or otherwise takes up slack in same. As shown in FIG. 5, reference numeral 87 refers to the existing engine and reference numeral 89 refers to the existing power train.

Accordingly, from the detailed description provided herein, it should be appreciated that, by utilizing the chassis-frame device of this invention including the two front wheels, a snow vehicle can be easily, quickly and simply converted to a wheel vehicle.

Having thusly described my invention, I claim:

1. A chassis-frame device and front wheels for converting a conventional snow vehicle to a wheel vehicle said snow vehicle having a pair of front skis and a longitudinally extending housing having disposed therein an endless driving track assembly, said track assembly comprising a rear sprocket and supporting arms, and a plurality of bogie wheels, and from which conventional snow vehicle the track assembly and front skis have been removed; said device comprising a pair of longitudinal side frame members and transverse support means, said side frame members having means for attachment to the lower portion of the sides of said housing of said snow vehicle, an axle, rear wheels, a driven sprocket, a drive sprocket, drive chain and front wheels; said frame members carrying said axle rearwardly thereon, said axle carrying and corotatably mounting said rear wheels centrally thereon and said driven sprocket; said snow vehicle being converted to a wheeled vehicle by replacing said front skis with said front wheels, by securing said frame members to the frame of the snow vehicle, by emplacing said drive sprocket on the engine drive shaft of said snow vehicle and by training said drive chain around said drive sprocket and said driven sprocket to thereby transmit drive to said rear wheels.

2. A device in accordance with claim 1, wherein said device further comprises an idler sprocket engaging said drive chain and wherein said idler sprocket is adjustably carried by a cross rod carried by said frame members to thereby adjust the tension or otherwise take up the slack on said drive chain.

3. A device in accordance with claim 1, wherein said device further comprises a brake means for stopping the snow vehicle converted to a wheel vehicle and wherein said brake means is operatively connected with said rear wheels.

References Cited

UNITED STATES PATENTS

| 3,435,907 | 4/1969 | Imhoff | 180—5 |
| 3,480,096 | 11/1969 | Hammitt | 180—5 |

RICHARD J. JOHNSON, Primary Examiner

U.S. Cl. X.R.

180—25